United States Patent Office 3,500,405
Patented Mar. 10, 1970

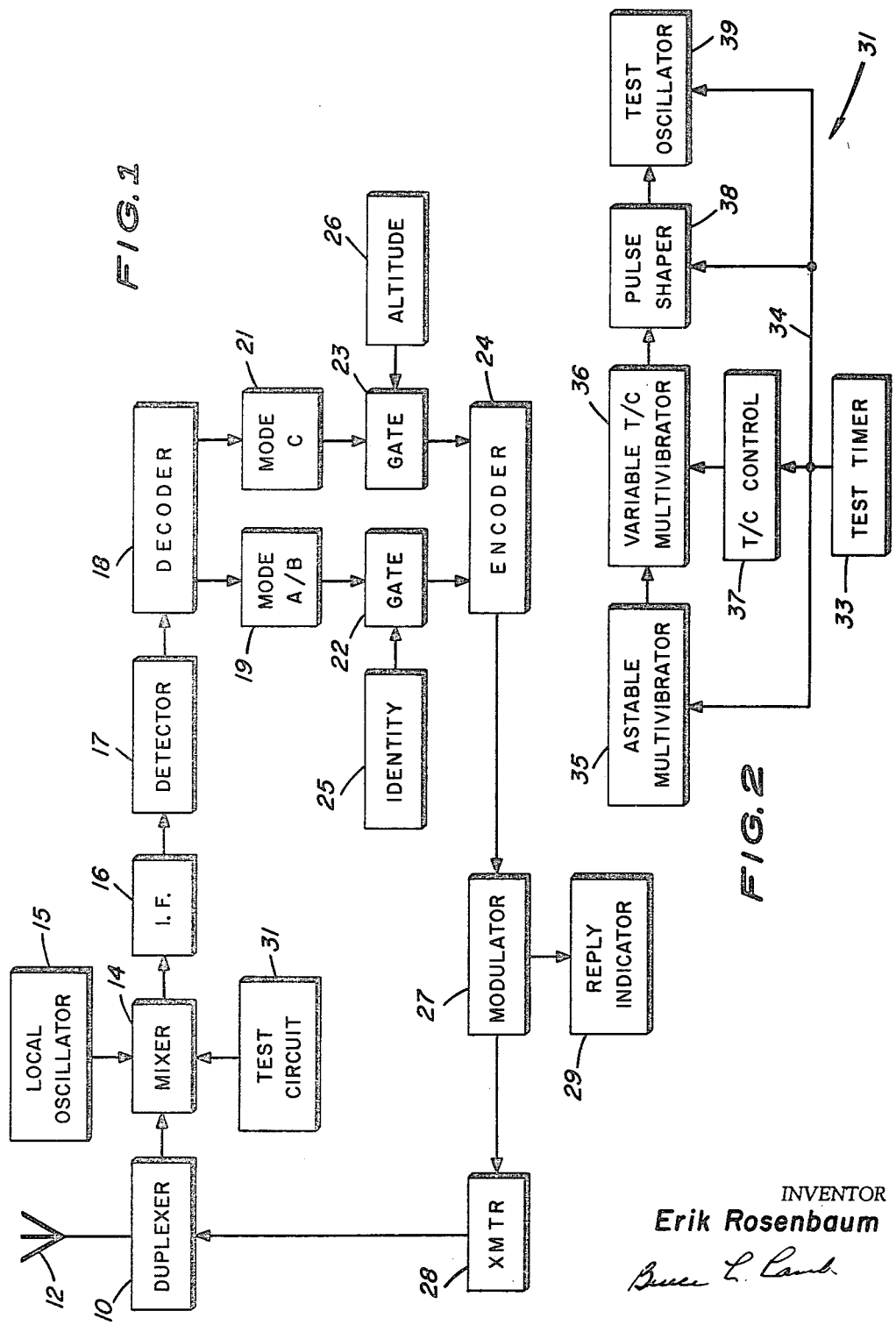

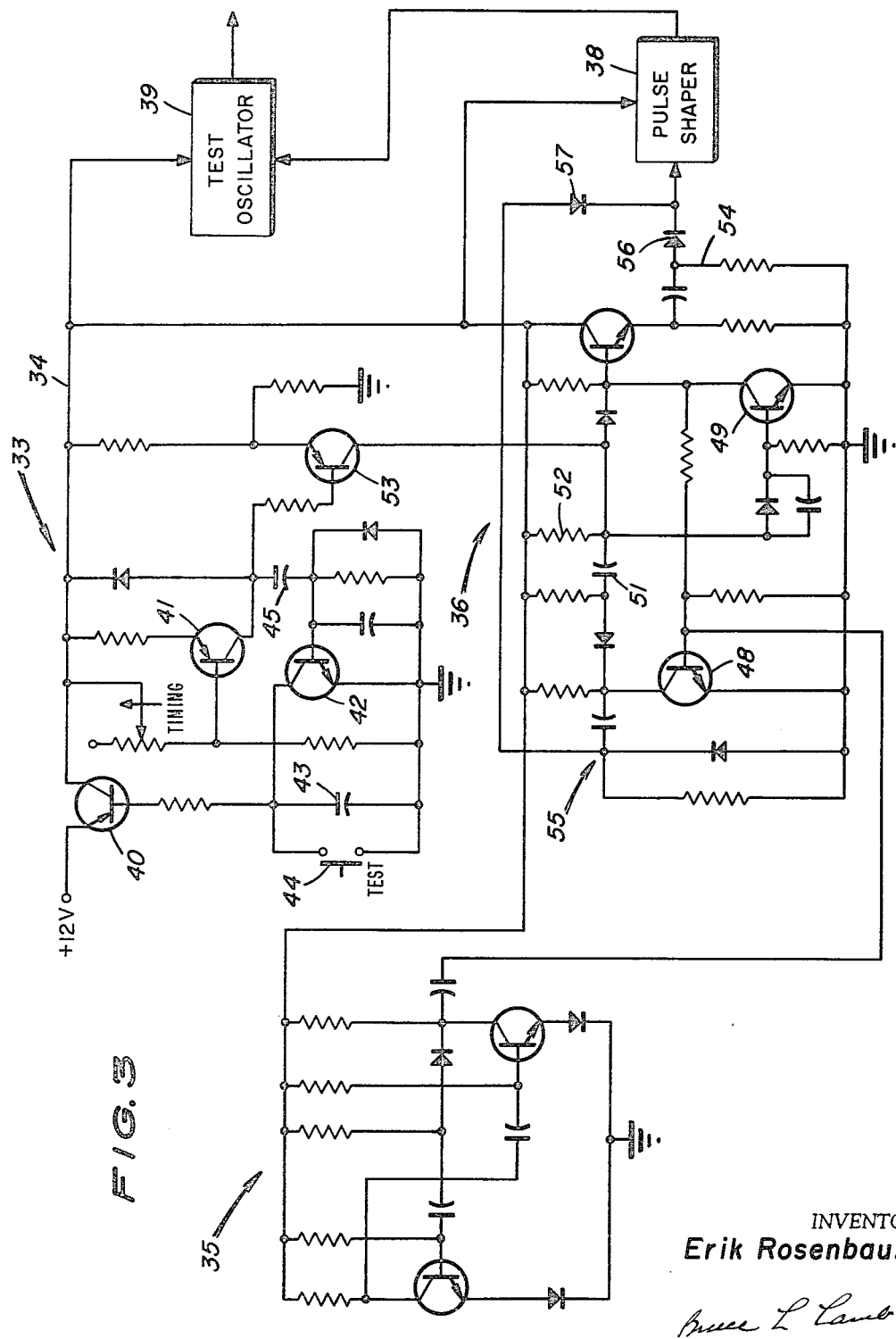

3,500,405
CIRCUIT FOR SIMULATING TRANSPONDER INTERROGATION SIGNALS
Erik Rosenbaum, Randallstown, Md., assignor to The Bendix Corporation, a corporation of Delaware
Filed Jan. 23, 1969, Ser. No. 793,476
Int. Cl. G01s 7/40
U.S. Cl. 343—17.7                     5 Claims

ABSTRACT OF THE DISCLOSURE

A circuit for simulating interrogation pulses for testing an ATC transponder. The circuit comprises means for generating successive pulse pairs, the pulses of each pair being separated by increasingly greater intervals so that all modes of interrogation are tested during each test cycle.

---

The present invention relates generally to airborne transponders, and particularly to automatic testing means for assuring integrity of the system during actual operation.

The Air Traffic Control Radar Beacon System (ATCRBS) is now in use domestically and abroad to provided radar equipped air traffic control centers with the identity and altitude of responding aircraft. Such information is usually not available to ground radars alone since one aircraft is not uniqely distinguishable from another by means of its radar return and since altitude determination would require either a separate height-finding radar or a radar having a narrow pencil beam and a complicated antenna scanning system.

The ATCRBS simplifies ground radar installations by transferring to the aircraft the burden of reporting identification and altitude. Each cooperating aircraft is equipped with a transponder which responds to an interrogaton signal from the ground with either its identification or its altitude, depending on the nature of the interrogation. The modes of interrogation are identified as A, B and C for civil use. Interrogation signals comprise a pair of pulses in which the pulse spacing distinguishes the various modes of interrogation. Modes A and B query the identity of an aircraft by transmitting, respectively, a pulse pair spaced by 8 μs. or 17 μs. Mode C consists of a pulse pair with 21 μs. spacing. Mode B is principally in use on European airways but versatile equipment will accommodate either mode A or B to be useful internationally.

When a proper interrogation is received and recognized by the airborne transponder a reply is formulated consisting of two framing pulses spaced 20.3 μs. apart and as many as 12 intervening pulses, each of which is 0.45 μs. long and spaced no closer than 1.45 μs. apart. The availability of 12 distinct pulses permits the formation 4096 different combinations, any one of which would be assigned as a flight identification number, while an ordered arrangement of combinations represents altitude. The identification code is manually selected by the operator and remains unchanged during a flight. The altitude code is automatically selected by a barometrically operated encoder. Once the identificaton code is selected and the transponder is turned on, no further attention is required by the operator. It is desirable, however, that the operator be assured that the transponder is operative since entrance to certain airways and flight levels is prohibited to aircraft without transponders. Prior transponders have included means for testing the units in flight by applying a simulated interrogation signal at the input and indicating the generation of a reply signal. Simulation of interrogation signals has heretofore been accomplished by using separate delay lines or the transponder decoder delay line to generate properly spaced pulse pairs. These means had the disadvantages of either not properly testing the transponder decoder circuits or not testing automatically for all modes of interrogation.

It is an object of the present invention to provide transponder testing means which do not rely on use of the transponder decoding means thereby to insure a more complete test of the equipment.

It is also an object of the invention to provide means for testing a transponder in all modes of interrogation without requiring manual switching to select the test mode.

Briefly, the present invention comprises circuit means for simulating an interrogation signal in which pulse pairs are generated at a repetition rate, suitably of 1 kHz., during a test cycle lasting about 10 seconds. The spacing between pulses of each pair varies continuously during the test from a minimum value of about 3 μs. to a maximum value of about 40 μs. A pulse pair having a spacing corresponding to each of the modes of interrogation will thus appear during each test. The integrity of the unit will be indicated by a flash of a reply lamp, which is energized by the modulator of the transponder, for each interrogation mode. If the transponder is operating in modes A and C, two flashes of the reply lamp shows that the equipment is operable.

In the drawings:
FIG. 1 is a functional block diagram of a transponder system which includes testing means;
FIG. 2 is a functional block diagram of the testing means of the invention; and
FIG. 3 is a schematic diagram of details of the invention.

The transponder will be briefly described as an introduction to the details of the test circuit of the invention. Referring to FIG. 1, a duplexer 10 permits use of a single antenna 12 for transmission and reception. Received signals pass from the duplexer to a mixer 14 where they are combined with the output of a local oscillator 15 for reduction to an intermediate frequency. The IF signal from mixer 14 is amplified at 16 and detected at 17 to provide video pulses to a decoder 18. The decoder 18 is usually in the form a delay line tapped at intervals corresponding to the modes of interrogation. These taps are connected to coincidence detectors to which the undelayed video pulses are also applied. The coincidence detectors reject pulse pairs with spacings different from the delay line tap and thus recognize a true interrogation signal and the mode of interrogation. The outputs of coincidence detectors 19 and 21 control code transfer gates 22 and 23. An interrogation signal in mode A or B will cause gate 22 to be enabled, thereby permitting the aircraft identification code to enter the encoder circuit 24 from the identity code selector 25. If the interrogation is in mode C, gate 23 will be enabled, while gate 22 is inhibited, permitting the altitude code to enter the encoder 24 from an altitude digitizer 26.

The encoder circuit 24 may also suitably comprise a tapped delay line which will transmit pulses at the delay intervals selected by whichever of the coding means 25 or 26 is enabled. The encoder output, consisting of a pulse train of as many as 14 pulses, enters a modulator 27, which controls the output of a transmitter 28. The reply indicator 29 provides a visual signal whenever modulator 27 produces an output. The test circuit 31 of the invention produces a simulated interrogation signal whenever it is actuated by the operator. The test signal is an RF carrier modulated by variably spaced pulse pairs, as previously explained. The test signal frequency may be equal to the receiver frequency or equal to the IF frequency.

Referring to FIG. 2, a test timer 33 supplies power for the duration of the test, approximately 10 seconds, upon actuation by the operator. When power from timer 33 appears on bus 34, the astable multi-vibrator 35 begins operation to establish the rate of production of interrogation signals at about 1 kHz. A variable time-constant multi-vibrator 36 is triggered by pulses from multi-vibrator 35 to produce one cycle of operation for each trigger pulse. The "on" cycle of multi-vibrator 36 is varied continuously during the test by a time-constant control 37 causing the "on" period to lengthen successively for each trigger pulse. The leading edge and trailing edge of the "on" output from multi-vibrator 36 are formed into two separate pulses in pulse shaper 38. The output of shaper 38 therefore comprises pairs of pulses with successively lengthening intervals of separation between the pulses of each pair. These pulse pairs key a test oscillator 39, which operates preferably at the receiver IF, or alternatively at the receiver frequency, to inject a pulse modulated RF signal into the high frequency circuits of the system. Thereafter, the test signals are amplified and detected in the normal manner, and a reply will be transmitted once for each pair corresponding to an interrogation mode.

Referring to the schematic of FIG. 3, the timing circuit includes transistors 40, 41, and 42. The D.C. path for base current of transistor 40 is through transistor 42. Under steady state conditions, base current from transistor 40 will charge capacitor 43 very nearly to the level of the supply voltage, causing transistor 40 to be non-conductive. When capacitor 43 is discharged by a momentary short circuit completed through test switch 44, transistor 40 becomes saturated thus supplying power to the test circuit on line 34. A timing capacitor 45 then commences to charge at a controlled rate through transistor 41. During charging of capacitor 45 bias current flows through transistor 42 holding that transistor saturated and preventing charge from accumulating on capacitor 43. After about 10 seconds, capacitor 45 is fully charged thereby cutting off bias current to transistor 42 which then becomes non-conductive and capacitor 43 rapidly charges to cut off transistor 40. With transistor 40 again non-conductive, power no longer appears on bus 34 thus ending the test cycle.

Upon the appearance of power at the beginning of a test, astable multi-vibrator 35, which is of conventional design, commences to produce trigger pulses at about a 1 kHz. rate. Each output pulse from multi-vibrator 35 triggers monostable vibrator 36 through one conduction cycle. Multi-vibrator 36 includes transistors 48 and 49, the latter of which is conductive in the stable state. When transistor 48 is triggered into conduction, capacitor 51 is rapidly discharged thereby removing the normal bias voltage to transistor 49. The states of transistors 48 and 49 reverse until charge has accumulated on capacitor 51 sufficient to cause transistor 49 again to conduct. The output of transistor 49 is therefore a positive pulse having a duration dependent upon the charging time of capacitor 51. Capacitor 51 charges through a high valued resistor 52 which is connected in parallel with a transistor 53. Conduction through transistor 53 is controlled by the voltage appearing upon capacitor 45. At the beginning of a test cycle, the voltage upon capacitor 45 is at a relatively low level thus causing the emitter-base voltage of transistor 53 to be high and to conduct heavily for rapid charging of capacitor 51. At a later time in the test cycle, the voltage on capacitor 45 will have increased, reducing conduction through transistor 53 and requiring a longer time for the charge on capacitor 51 to rise to a level causing conduction through transistor 49. Thus, pulses from multi-vibrator 36 progressively increase in length.

The leading edge of the output pulse from multi-vibrator 36 is defined as the instant transistor 49 becomes non-conductive. The trailing edge of the output pulse appears when transistor 49 again conducts. The leading and trailing edges of the pulse likewise mark the period of conduction of transistor 48. The output of transistor 49 is coupled through an emitter follower 51 to an R-C differentiating network 54. The output of transistor 48 is differentiated in network 55. Diodes 56 and 57, respectively connected to networks 54 and 55, conduct only the positive going pulses from the networks to a pulse shaping amplifier 38. Thus an input will be applied by diode 56 to the pulse shaper 38 upon the appearance of the leading edge of the output from multi-vibrator 36, and diode 57 will apply a pulse upon the appearance of the trailing edge from multi-vibrator 36. These two pulses will be separated by a time equal to the duration of output from the multi-vibrator. The pulse pair from pulse shaper 38 then keys test oscillator 39 to produce the simulated interrogation signal.

The invention claimed is:

1. A test circuit for simulating transponder interrogation signals, comprising
    a monostable multivibrator including first and second active elements having positive feedback from said second element to said first element and a time dependent charging circuit for biasing said second element into a stable state;
    means applying a momentary trigger signal to said first active element to cause transition from the stable states of said elements for a period depending on the time constant of said charging circuit;
    means responsive to a control signal for varying the time constant of said charging circuit; and
    differentiating means for producing a pair of pulses, one of which is coincident with the beginning and the other of which is coincident with the end of the transitory period of said elements.

2. A circuit as claimed in claim 1 wherein said trigger means produces a repetitive output and wherein said control signal is a time varying function thereby producing interrogation signals in the form of pulse pairs having successively greater intervals separating pulses of each pair.

3. A circuit as claimed in claim 2 with additionally:
    a test oscillator modulated by said interrogation signals; and means coupling said oscillator output to the input of the transponder.

4. A circuit as claimed in claim 1 wherein said charging circuit comprises a capacitor, a resistor connected to supply charging current to said capacitor, and an electrically variable impedance also connected to supply charging current to said capacitor, said impedance constituting said means for varying the time constant of said charging circuit.

5. A circuit as claimed in claim 4, with additionally, a second charging circuit, said second charging circuit, upon actuation, providing a substantially linearly varying output for controlling said variable impedance of said charging circuit.

References Cited

UNITED STATES PATENTS 3,195,132    7/1965    Battle et al. _____ 343—17.7 X
3,353,181   11/1967    Preuss _____ 343—17.7

RICHARD A. FARLEY, Primary Examiner

T. H. TUBBESING, Assistant Examiner